Jan. 9, 1968  E. D. BELL  3,362,726
BI-WHEELED VEHICLE HAVING LATERAL STABILIZING MEANS
Filed Oct. 24, 1965
Fig. 1
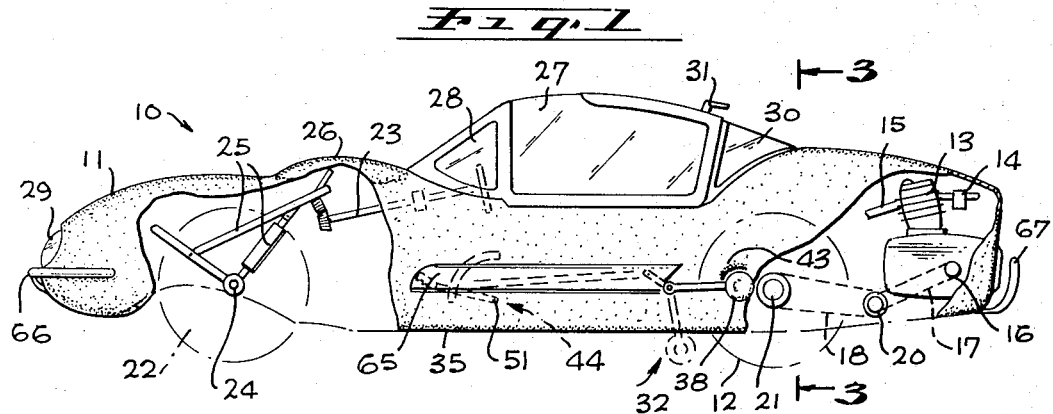
Fig. 2
Fig. 3
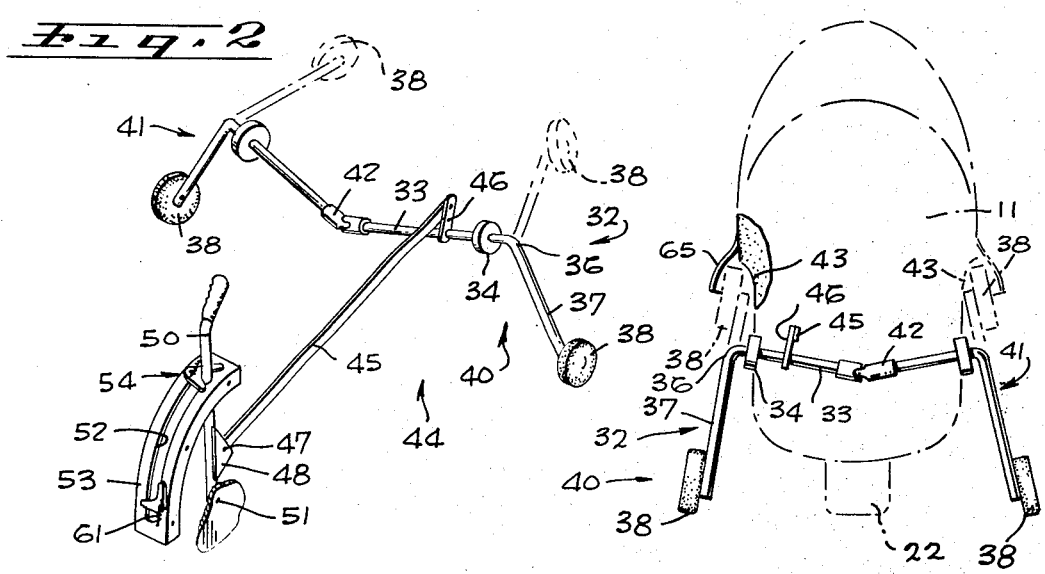
Fig. 4
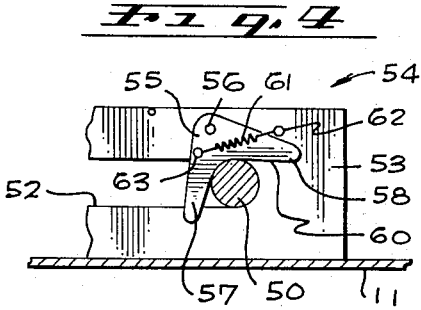
Fig. 5
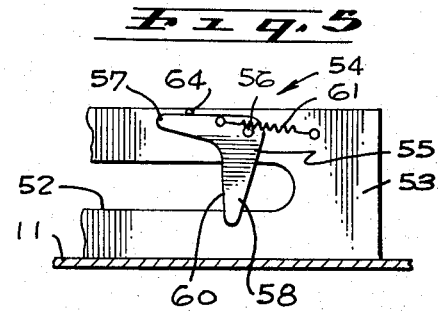
INVENTOR.
EDWARD D. BELL
BY
Roger A. Marrs

United States Patent Office 3,362,726
Patented Jan. 9, 1968

3,362,726
BI-WHEELED VEHICLE HAVING LATERAL
STABILIZING MEANS
Edward D. Bell, 5830 Denny Ave., North Hollywood,
Calif. 91601
Filed Oct. 24, 1965, Ser. No. 504,838
4 Claims. (Cl. 280—303)

ABSTRACT OF THE DISCLOSURE

A bi-wheeled vehicle is disclosed herein having a body of streamlined contour and configuration for enclosing an operator and further having lateral supporting means pivotally carried on opposite sides thereof adapted to extend outwardly and downwardly to stabilize the vehicle at reduced speeds and when at rest. Mechanical means are carried on the body and are operably connected to the lateral supporting means for selectively advancing and retracting the lateral supporting means.

This invention relates to roadable vehicles and more particularly to a streamlined motor vehicle supported on two wheels incorporating selectively advanced and retractable lateral supporting means for maintaining the vehicle substantially upright at reduced speeds or when the vehicle is immobile.

Roadable vehicles, such as motorcycles or the like, have been used for many years wherein a driver employs his weight to maintain balance of the vehicle on a pair of in-line wheels wherein one wheel is employed for the function of steering and the other wheel is employed for furnishing motor drive. However, at very slow speeds and particularly when the vehicle is immobile, the vehicle will topple over unless some lateral support is effected by the extension of the driver's legs outwardly into contact with the roadway or pavement. However, in the instance of the present invention, a roadable bi-wheeled vehicle is contemplated which entails the enclosing of the driver or occupant in a streamline contoured body so that air resistance and drag attendant thereto is greatly reduced. Also, the enclosure or body serves to relate the occupant thereof to a conventional four wheeled automobile or car whereby the occupants of the vehicle are protected against rush of oncoming air, inclement weather and the like.

Obviously, when a two-wheeled vehicle is enclosed about the occupants thereof, it is impossible to stabilize or laterally support the vehicle at extremely slow speeds or while the vehicle is at rest by the use of the body extremeties. In many instances, certain bicycle accessory items known as "kick-stands" are sometimes employed to laterally support a vehicle but such devices are of no use when the vehicle is moving at slow speeds. In fact, such devices are generally biased rearwardly so that any forward movement of the vehicle from an at rest position will automatically cause the retraction of the kick-stand. Conversely, rearward movement of the vehicle would be completely prohibited since such stands would dig into the pavement or vehicle supporting surface.

Accordingly, the device of the present invention obviates the problems and difficulties encountered with the lateral support of bi-wheel motorized roadable vehicles wherein a streamlined contoured body is provided which encloses the occupant situated in such manner as to straddle the central longitudinal axis of the body. On opposite sides of the body, there is provided elongated lateral supporting means which are pivotally carried in close proximity to the undersurface of the body ahead of the rear driving wheel which are adapted to swing outwardly and downwardly to an advanced position whereby the end of the means engages the roadway so that the body is laterally supported thereby in a substantially upright position. Furthermore, the present invention provides manually operable control linkage which is operably connected to the lateral supporting means for selectively advancing such means to the advanced position and for retracting such means upwardly and rearwardly to the stored position. By incorporating wheels on the extreme ends of such means, the vehicle may be supported in an upright position during the travel of the vehicle at slow or moderate speeds. Once high speed has been achieved, the lateral supporting means may be retracted so that the weight of the occupant may be employed to effectively balance the vehicle on the two wheels.

Therefore, it is an object of the present invention to provide a novel bi-wheel roadable vehicle supported on fore and aft wheels and having a completely enclosed body for said vehicle incorporating lateral supporting means from the opposite sides thereof.

Another object of the present invention is to provide a novel roadable bi-wheeled vehicle incorporating extendable and retractable lateral supporting means which may be selectively advanced to support the vehicle at low speed or when immobile and which may be retracted upwardly and rearwardly into receiving storage wells formed in the body contour.

Still another object of the present invention is to provide a novel bi-wheeled roadable vehicle having a streamlined contoured body completely enclosing the vehicle and its occupants which includes retractable outriggers from the opposite sides of the body for laterally supporting the vehicle in a substantially upright position at relatively slow vehicle speeds and while the vehicle is at rest.

Still another object of the present invention is to provide a novel roadable bi-wheeled vehicle having a streamlined enclosure for the occupant which includes manually operable control linkage which is connected to lateral supporting means for the vehicle whereby the supporting means may be selectively extended and retracted from within the body so that the vehicle can be stabilized during relatively slow speeds or while the vehicle is immobile or at rest.

Yet another object of the present invention is to provide a novel bi-wheeled motorized roadable vehicle having a streamlined contoured body which protects the occupants from inclement weather and adverse road conditions and which is capable of maintaining vehicle stability during various modes of vehicle operation.

A further object of the present invention resides in novel bi-wheeled roadable vehicle having a streamlined enclosure for its occupants which is economical to manufacture, relatively inexpensive to operate and which is more compact in size than heretofore known in the art.

The features of the present invention which are believed to be novel are set forth with particularity in the appended claims. The present invention both as to its organization and manner of operation, together with further objects and advantages thereof, may best be understood by reference to the following description, taken in connection with the accompanying drawings, in which:

FIGURE 1 is a side elevational view of the novel bi-wheeled motorized vehicle incorporating the extendable lateral supporting means in accordance with the present invention;

FIGURE 2 is an enlarged perspective view of the lateral supporting means included in the vehicle illustrated in FIGURE 1;

FIGURE 3 is a cross-sectional view of the vehicle shown in FIGURE 1 illustrating the lateral supporting means incorporated therein as taken substantially in the direction of arrows 3—3;

FIGURE 4 is a plan view, greatly enlarged, of the biasing means employed in the lateral supporting means control mechanism shown in FIGURE 2 for releasably retaining the control handle in one position; and FIGURE 5 is a view similar to the view shown in FIGURE 4 illustrating the biasing means, in an alternate position to the position illustrated in FIGURE 4, lying in the path of handle travel.

Referring now to FIGURE 1, a bi-wheeled motorized vehicle is indicated in the general direction of arrow 10 which comprises in general, a body 11 having a streamlined contour and which serves as an enclosure for occupants such as a driver and a passenger as well as an enclosure for the power plant and vehicle operating mechanisms. The vehicle includes a rear wheel 12 which is powered by a conventional two-cycle engine 13 which includes a suitable carburetor 14 and a conventional exhaust system indicated diagrammatically by the numeral 15. Power from the engine 13 is provided to the wheel 12 via a conventional transmission 16 by means of drive chains 17 and 18. Chains 17 and 18 are looped about a transfer sprocket 20 while the opposite end of the chain 18 is operably connected to a vehicle axle 21 mounting the wheel 12.

The vehicle 10 is also provided with a front wheel 22 which is employed for steering purposes and is actuated by means to a steering mechanism comprising, in general, a steering post 23 operably connected to an axle 24 carrying the wheel 22 by means of a conventional trailing link front suspension system represented by the numeral 25. It is to be particularly noted that the steering mechanism does not lend itself to a smooth enclosure contour because of the necessary extension of the steering mechanism 25 upwardly. Therefore, to maintain a streamlined contour for the body enclosure while at the same time providing a vehicle body which offers a low center of gravity, the body 11 is formed with an enlarged smooth and rounded fairing 26. The fairing 26 is disposed forward of a substantially transparent enclosure 27 and its attendant windshield 28 on the hood portion of the vehicle terminating about the aft portion of the forward wheel 22.

The vehicle of the present invention is capable of carrying a driver and one passenger in an in-line relationship so that they straddle the central longitudinal axis of the body. Both the driver and the passenger have suitable external visibility via the windshield 28, the transparent enclosure 27 and through a rear window 30. Ingress and egress to and from the vehicle is effected by raising the transparent enclosure 27 by means of a handle 31 which opens the interior of the vehicle to accommodate the entering or exit of occupants. The roadway ahead of the vehicle may be illuminated by a single light 29 operably mounted in the fore end of the vehicle body 11.

Lateral supporting means indicated in the general direction of arrow 32 are provided for the vehicle 10 so that the vehicle will be supported in a substantially upright position during travel at reduced speeds and while the vehicle is at rest. The lateral supporting means 32 comprises, in general, a rod 33 having its midsection rotatably mounted in a bearing 34 carried on the side wall of the body 11 near an undersurface 35 of the vehicle immediately ahead of the rear wheel 12. The rod 33 progresses through the bearing 34 and is formed with a bend 36 at a substantial right angle thereto to form a leg member 37. The leg member 37 terminates in a rollable wheel 38 which is adapted to roll when the lateral supporting means has been extended while the vehicle is moving.

It is to be particularly noted that the rod 33 and its integrally formed leg member 37 as well as the bearing 34 and wheel 38 are repeated on the opposite side of the vehicle from the side illustrated in FIGURE 1. Numeral 40 may be said to represent the left hand supporting means while numeral 41 indicates the supporting means for the right hand side of the vehicle. Both means are joined together by means of a universal joint 42 which connects the adjacent ends of rod 33 so that the activation of the lateral supporting means applied to one section will be followed by the lateral supporting means on the opposite side thereof.

The retracted position of the leg member 37 and wheel 38 is shown in solid lines in FIGURE 1 and in FIGURE 3 in dotted lines wherein the wheel 38 and a portion of the leg member is received within a contoured recess 43 formed in the sidewall of the body 11 adjacent the rear wheel 12. As shown in broken lines in FIGURE 1 and in solid lines in FIGURE 3 and FIGURE 2, the lateral supporting means are shown in their advanced positions operable to stabilize the vehicle in an upright condition or position.

It is to be particularly noted with respect to FIGURE 2 that when the leg members 37 are extended as rod 33 is rotated clockwise, wheel 38 moves outwardly and downwardly; conversely, when the rod 33 is actuated in an opposite direction, wheel 38 moves upwardly and rearwardly into the storage wells 43 on opposite sides of the vehicle. As noted particularly in FIGURE 3, the right and left hand lateral supporting means are canted outwardly in opposite direction from the central axis of the vehicle at which point the universal joint is located.

A control means is provided for advancing and retracting the lateral support means which is indicated in the general direction of arrow 44 in FIGURES 1 and 2. The control means is enclosed within the body 11 and includes a rod or bar 45 which is located between the driver of the vehicle and the rod 33 wherein one end of the rod 45 is connected to a bell crank 46 which is suitable anchored at its other end of the rod 33 and the opposite end of rod 45 is terminated in a pivoted connection 47 with a bracket 48. The bracket 48 is secured to a lower portion of an operating handle 50 which is pivotally anchored to a suitable frame or portion of the body 11 at point 51. Handle 50 is arranged to travel in an elongated slot 52 provided in a quadrant 53 which is secured to the frame or the body 11 in close proximity to the driver. It is to be particularly noted that the handle 50 is oriented in a vertical plane when the leg members 37 are in their advanced position. Likewise, when the handle 50 is in its extreme horizontal position at the opposite end of the quadrant, the leg members 37 are positioned in their stored position against the opposite sides of the body 11.

To maintain the operating handle 50 in either its upper or lower position, an up lock and a down lock is provided such as in indicated by the up lock 54 in FIGURE 2. Referring now to FIGURES 4 and 5, an enlarged representation of the up lock 54 is shown. Lock 54 takes the form of a plate member 55 which is pivotally connected by pivot 56 to the quadrant and which includes a pair of projections 57 and 58 which are arranged substantially at a right angle to each other. The bracket is further provided with a cam surface 60 that coextends between the adjacent peripheral edges of the projections 57 and 58 against which the handle 50 engages. As shown in FIGURE 4, the handle 50 engaging the cam surface 60 is held against the extreme end of the slot 52 in the quadrant 53. An expanded tension spring 61 is extended between a hole 62 provided in the quadrant 53 and a retainer 63 carried on the bracket 55 which forcibly urges or biases the handle 50 against the end of the slot 52. However, it is to be understood that the biasing of the lock 54 can easily be overcome by a driver by manually pushing the operating handle 50 downwardly through the slot 52 whereby the lock will pivot about point 56 to permit the passage of the operating handle through the slot into the lock position shown in FIGURE 5.

Referring now to FIGURE 5, the bracket member 55 is shown in its over center position whereby the spring 61 biases the projection 56 against a stop pin 64. In this position, projection 58 crosses the slot 52 so that cam surface 60 is in condition to interfere with the upward travel of operating handle 50. Upon the engagement of the handle 50 with the cam surface 60 of the projection 58, the bracket member 55 is pivoted clockwise so that the projection 57 couples the operating handle 50 against the end of the slot as shown in FIGURE 4. The handle can be urged out of lock from its upper position by either the driver or in instances when the wheels contact the ground at high speeds.

A feature of the present invention also resides in the fact that each side of the vehicle is protected by means of an elongated bumper 65, seen more clearly in FIGURE 3, which is in horizontal alignment with the lateral supporting means when such means are retracted into the storage well 43. The front end of the body 11 is protected by means of a front bumper 66 while the rear of the vehicle is protected by means of a bumper 67.

Therefore, it can be seen that the bi-wheeled motorized vehicle of the present invention provides a novel transportation vehicle for one or more persons which is vertically stabilized in all regimes of operating speeds or while at rest by retractable lateral supporting means. To retract the lateral supporting means, handle 50 is forcibly moved downward in the slot 52 of the quadrant 53 out of the lock 54 into locking engagement with the lower lock on the quadrant. This action causes the bar 45 to move forwardly which rotates bell crank 46 and bar 33. The bar 33 rotates in its bearing 34 to pivot leg member 37 upwardly and rearwardly in a counterclockwise direction so that the wheels 38 reside within the storage wells 43. To advance the lateral supporting means, the operating handle 50 is forcibly urged upward through the slot 52 of the quadrant which rotates the bar 33 in a clockwise direction via bar 45 so that the wheels 38 are moved downwardly and outwardly.

While particular embodiments of the present invention have been shown and described, it will be obvious to those skilled in the art that changes and modifications may be made without departing from this invention in its broader aspects, and, therefore, the aim in the appended claims it is cover all such changes and modifications as fall within the true spirit and scope of this invention.

I claim:

1. In a roadable bi-wheeled transportation vehicle adapted to be balance dby the weight of an occupant, the combination comprising:
an elongated streamlined contoured body enclosing the occupant situated in such a manner as to straddle the central longitudinal axis of the body;
elongated lateral supporting means pivotally carried on opposite sides of said body in close proximity to the undersurface thereof immediately ahead of the rear wheel and being adapted to swing outwardly and downwardly to an advanced position in rotatably contact with the vehicle supporting surface whereby said body is laterally supported in a substantially upright position to stabilize the vehicle at reduced speeds and when at rest; and
manually operable control linkage carried by said body and operably connected to said lateral supporting means for selectively advancing said supporting means to said advanced position and retracting said supporting means upwardly and rearwardly to a stored position along the opposite sides of said body and further including a pair of pivoting detent means arranged in spaced apart relationship and resilient means connected to each of said detent means for biasing said control linkage into its respective advanced and stored positions.

2. The invention as defined in claim 1 wherein
said lateral supporting means includes a rigid leg member rotatably mounted in a bearing secured to the side wall of said body
said leg member having a wheel rotatably mounted on its free end; and
said body having elongated wells formed in opposite sides of said body to receive said leg member and said wheel when said lateral supporting means is in its stored position.

3. The invention as defined in claim 2 wherein
said body is formed with a smooth fairing ahead of the occupant's compartment adapted to accommodate portions of the vehicles steering mechanism.

4. The invention as defined in claim 2 wherein
said control linkage includes a movable rod extending along the inside of said body;
a lever connected on one of its ends to said rod and its other end pivotally secured to one of said leg members of said lateral supporting means; and
a handle pivotally connected to the other end of said rod; and
cross arm means operatively coupled with the other of said leg members to said first leg member so that vertical movement of said handle effects the positioning of said lateral supporting means into its advanced and stored position.

References Cited

UNITED STATES PATENTS

| 1,304,783 | 5/1919 | Lederer | 74—533 |
| 1,858,743 | 5/1932 | Langstreth | 180—33 |
| 2,908,510 | 10/1959 | Lossau | 180—33 X |
| 3,075,789 | 1/1963 | Hott | 280—295 |

FOREIGN PATENTS

| 1,207,435 | 9/1959 | France. |
| 725,983 | 3/1955 | Great Britain. |
| 505,518 | 12/1954 | Italy. |

KENNETH H. BETTS, *Primary Examiner.*